Patented Dec. 25, 1945

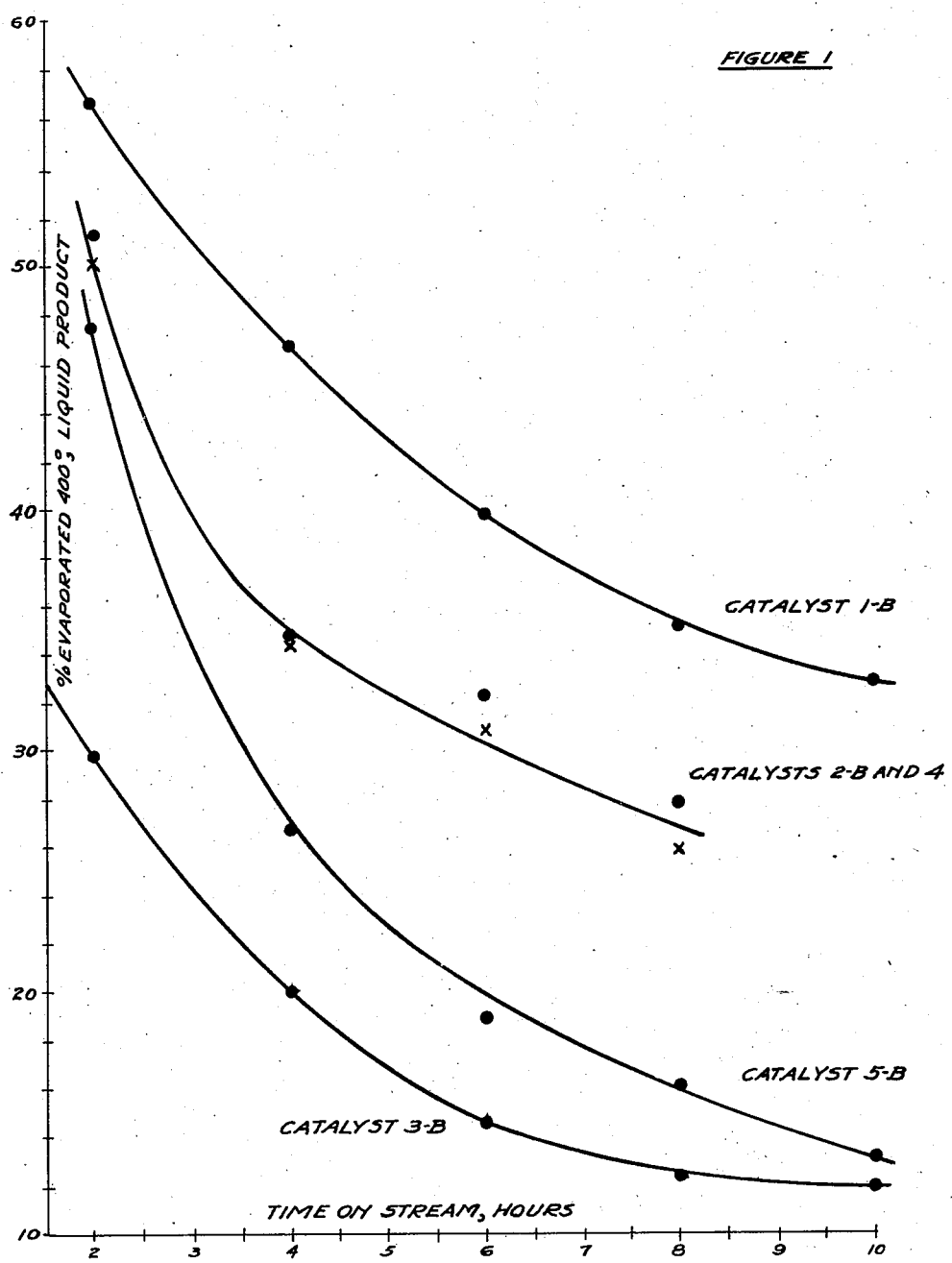

2,391,482

UNITED STATES PATENT OFFICE 2,391,482

TREATMENT OF HYDROCARBONS

Robert F. Ruthruff, Chicago, Ill., assignor, by direct and mesne assignments, of one-half to The M. W. Kellogg Company, Jersey City, N. J., a corporation of Delaware, and one-half to Process Management Company, Inc., Wilmington, Del., a corporation of Delaware Application November 21, 1939, Serial No. 305,473

3 Claims. (Cl. 196—52)

The present invention relates to the conversion of hydrocarbons, and particularly to the conversion of high boiling hydrocarbons to low boiling hydrocarbons by catalysis. More particularly, the invention is directed to the conversion of high boiling hydrocarbon fractions such as reduced crudes, gas oils and the like to low boiling fractions within the gasoline or motor fuel boiling range by vaporizing the high boiling hydrocarbons and passing the vapors at an elevated temperature suitable for cracking in contact with a synthetically prepared complex mixture, or compound, of silica and alumina.

One of the objects of my invention is the provision of a catalyst for the conversion of high boiling hydrocarbons to low boiling hydrocarbons which may be readily and economically prepared synthetically, and which exhibits a high degree of activity in catalyzing such conversion reactions, particularly the conversion of high boiling hydrocarbons such as reduced crudes and gas oils to motor fuel fractions.

A further object of my invention is the provision of a catalyst for such conversions which may be readily and satisfactorily regenerated by oxidation of the carbonaceous material deposited thereon during the conversion.

Various other objects and features of my invention will be apparent as the description thereof proceeds.

The synthetic silica-alumina complexes employed pursuant to my invention differ radically in physical structure and chemical composition from natural-occurring or acid-treated adsorbent clays such as "Super Filtrol" which have been heretofore proposed for use in the catalytic cracking of hydrocarbons. While the exact physical and chemical composition of the synthetic silica-alumina complexes employed is not fully understood and accordingly may best be described by reference to their method of preparation, they, in general, comprise silica gel associated or "activated" with alumina in an amount and in such manner as to impart a high degree of catalytic activity in the conversion of high boiling hydrocarbons to motor fuel fractions as compared with the catalytic activity for such reactions of either silica gel or alumina alone.

In practicing my invention, the high boiling hydrocarbons undergoing treatment are vaporized, and the vapors passed in contact with the catalyst for a time and at a temperature sufficient to effect the required conversion. The oil to be converted or cracked such as a relatively heavy hydrocarbon oil is heated and passed in contact with the catalyst at an elevated temperature of the order of about 700° to 1000° F. and preferably at atmospheric pressure, but higher pressures may be used. Under these conditions the catalyst promotes the conversion of higher boiling components to lower boiling components. The converted products are then cooled and separated into liquid and gases. The separated liquid at the beginning of the operation contains upwards of about 30% of light constituents boiling off up to about 400° F. The separated liquid has a lower end point than the end point of the initial charge of hydrocarbon oil and this shows that the catalyst effected conversion of all components of the charge. The separated liquid may be fractionated to separate gasoline constituents boiling off below about 400° to 425° F. from condensate oil. The condensate oil may be heated and recycled to the catalyst for further conversion, or it may be given any further treatment desired.

The catalyst employed in accordance with the invention is made by first producing a highly porous and adsorptive silica gel and then activating the gel by associating alumina therewith, preferably by a procedure involving the hydrolytic decomposition of a soluble salt of aluminum in contact with the gel. It has been ascertained that the procedure employed in the preparation of the silica gel and in the alumina-activation treatment is of major importance for the production of a catalyst exhibiting a high degree of activity in the conversion of high boiling hydrocarbons to low boiling hydrocarbons, as will be apparent from a consideration of the following examples illustrating various embodiments with respect to catalyst preparation and their use in accordance with the invention.

EXAMPLE 1

A. *Silica component.*—A sodium silicate solution is prepared by diluting 200 volumes of a commercial grade of waterglass having a specific gravity of 1.3956 and analyzing 8.85% $Na_2O$ and 28.5% of $SiO_2$, with 300 volumes of water. This solution is treated with 250 volumes of 6N sulfuric acid. Upon treatment with the acid, the sodium silicate is decomposed, forming colloidal silica and the sodium salt of the acid. The two solutions are preferably mixed slowly and concurrently, as for example, by simultaneously running a stream of each into the mixing vessel, thus assuring a desired concentration of excess acid in the reaction mixture at all times. Under these conditions, the silica apparently separates as such relatively quickly but forms a colloidal suspension or "sol" which sets slowly, all water present being absorbed, to form a fairly stiff jelly-like material or "hydrogel," the lapse of several hours, for example, 9 hours, being required for the formation of the desired hydrogel. The solubles present in the hydrogel (primarily sodium sulfate) are next removed by careful washing. The hydrogel may be passed through a four-mesh sieve to bring it into the form of lumps to facilitate washing. Water is added and the mixture vigorously stirred, following which the hydrogel is separated from the wash water in any suitable manner, as for example, by filtration or centrifuging. The washing operation is preferably repeated about six times in order to assure substantially complete removal of solubles.

B. *Activation with alumina.*—The thoroughly washed silica hydrogel is next activated by the addition of alumina thereto. The activation treatment is preferably effected by digestion of the washed hydrogel at steam bath temperatures for several hours, for example, about 2 hours, with a solution of a salt of aluminum. A satisfactory mixture for this purpose has been ascertained to be 55.5 parts of aluminum sulfate $(Al_2(SO_4)_3.18H_2O)$, 5000 parts of water, and 275 parts of silica (dry basis), all parts being by weight. Following activation, the activated hydrogel is separated from the activating solution, for example, by filtration, and again thoroughly washed by the same procedure as previously described, the washing treatment being preferably repeated about 4 to 6 times to assure the removal of all detrimental solubles. The hydrogel is then carefully and slowly dried, for example, at a temperature of about 220° after which it is ready for use.

A modification of the above procedure found to be especially advantageous, involves partial drying of the silica hydrogel prior to washing. This may be conveniently effected by pouring the sol into shallow drying pans and then, after the hydrogel has formed, drying until the water content is reduced to about 50% by weight. Upon partial drying in this manner, the gel splits or cracks into strips having considerable mechanical strength, and which are then washed by successive soakings in a suitable quantity of wash water, and removal of the wash water by decantation, or otherwise until the solubles are reduced to the required extent. The washed gel is then activated as previously described.

A second modification of the above procedure which has been found to be especially advantageous in order to avoid an undue amount of extremely finely divided material in the product, is the subjection of the washed hydrogel after activation to a mechanical working adapted to reform or "cream" the hydrogel particles into a single jelly-like mass prior to drying. This may be accomplished, for example, by kneading the hydrogel particles by hand, passing them through a homogenizer, or by mechanically working in a blade-mixing machine. The hydrogel particles are thus converted into a thick liquid which when allowed to stand, assumes many of the properties of the original hydrogel. By pouring this liquid into pans and drying, gel particles of practically any desired size may be obtained with no fines. By rapid drying, the final gel is obtained in the form of relatively small particles which increase in size as the rate of drying is decreased. By following this procedure no great care need be exercised in the washing process to avoid shattering of the firm but mechanically weak hydrogel with a view to avoidance of fines. In general, it is even preferable to disintegrate the hydrogel deliberately to facilitate washing, and then reform the small particles by mechanically working as described prior to drying.

The preparation of catalysts, by procedures differing from the preferred procedure given in Example 1, will now be described as illustrative embodiments of catalysts suitable for use in accordance with the invention, and also as showing the specific advantages resulting from the practice of the preferred procedure.

EXAMPLE 2

A. *Silica component.*—250 cc. of a sodium silicate solution (water-glass) of a specific gravity of 1.413, was diulted with 315 cc. of water and heated to 125° F. To the heated solution there was added rapidly with stirring a solution made by diluting 177 cc. of concentrated hydrochloric acid with 244 cc. of water. The resulting mixture was stirred to break up the hydrogel structure, allowed to stand over night, and then filtered as dry as possible. The precipitate was then washed by slurrying with 2500 cc. of water and filtering, the washing treatment being repeated six times.

B. *Activation with alumina.*—Washed silica hydrogel prepared as described under A above, was activated by digestion for two hours at 160–170° F. with a solution made by dissolving 55.5 grams of aluminum sulfate $(Al_2(SO_4)_3.18H_2O)$ in 2500 cc. of water. The precipitate was then filtered and given six washing treatments as described above, and then dried at a temperature of about 212° F.

EXAMPLE 3

A. *Silica component.*—A solution was made by dissolving 568.5 grams of sodium metasilicate $(Na_2SiO_3.9H_2O)$ in 1000 cc. of water. After heating the solution to 125° F., a solution made by diluting 506.5 cc. of concentrated hydrochloric acid with 493.5 cc. of water was added rapidly and with vigorous stirring. After standing for several hours, the silica precipitate was separated by filtration and washed. In washing, the precipitate was stirred for 30 minutes with 2000 cc. of water following which the suspended silica was removed by filtration. This washing procedure was repeated six times.

B. *Activation with alumina.*—The final washed silica hydrogel filter cake from A was added to 5000 cc. of water containing 111 grams of aluminum sulfate $(Al_2(SO_4)_3.18H_2O)$. The suspension was heated to about 160–170° F. and maintained at this temperature with occasional agitation for two hours, after which the alumina-activated silica was filtered and washed six times by the procedure outlined under A above. The final washed precipitate was dried before use at a temperature of about 212° F.

EXAMPLE 4

A. *Silica component.*—240 volumes of water were added to 160 volumes of water-glass of a specific gravity of 1.3956 and analyzing 8.85% $Na_2O$ and 28.5% $SiO_2$. This solution was added rapidly and with stirring to 200 volumes 18° Bé. hydrochloric acid diluted with 200 volumes of water. After the reaction was complete the reaction mixture was passed through a one-inch screen, resulting lumps being washed by passing upward through them. The gel was then dried in a current of air heated to 100–120° F., following which it was again washed, water being passed over it over a period of twenty-four hours.

B. *Activation with alumina.*—The wet gel was activated by heating at the boiling point with an aluminum chloride solution for six hours, following which the gel was again washed and finally dried. In the activation process the $SiO_2$ (dry) to $AlCl_3.6H_2O$ ratio (by weight) was approximately 7.35.

EXAMPLE 5

A. *Silica component.*—A solution was made by diluting 750 cc. of ethyl-orthosilicate with 437.5 cc. of ethyl alcohol, containing 14 cc. of water. After standing 24 hours, 127.5 cc. additional water was added and the whole was evaporated to apparent dryness at about 125° F.

B. *Activation with alumina.*—Silica made from ethyl-orthosilicate as described under A above, was activated with alumina following the digestion procedure previously described using 55.5 grams aluminum sulfate $(Al_2(SO_4)_3.18H_2O)$ in 2500 cc. of water. The final catalyst was washed six times by decantation, 500 cc. of water per washing, and was dried at about 220° F. before use.

Alumina-activated catalysts prepared in accordance with the above examples were employed in accordance with the invention for the conversion of a Mid-Continent crude gas oil into gasoline, the respective runs being made under substantially similar conditions for purposes of comparison of the effectiveness of the catalysts. The conditions of the run, and results obtained are tabulated in appended Table 1.

The charging stock employed in these runs was a Mid-Continent crude gas oil having an A. P. I. gravity of 35.4, an initial boiling point of 482° F. and an end point of 748° F. The charge in vapor form was passed over the catalyst at a rate of 100 cc. of oil per hour per 240 cc. of catalyst. Liquid products were collected over each two-hour period, and a representative gas sample collected over a considerable portion of each period. Liquid products were subjected to A. S. T. M. distillation, and the gas sample analyzed by low temperature fractionation.

In order to have the results on a comparable basis, the properties of the liquid products were calculated, assuming that all butanes and higher boiling constituents of the gases were incorporated in the liquid products. The data thus obtained is tabulated in Table I under "Calculated prop. liquid," the quantity of gasoline based on liquid product being tabulated under "Ev. 400°," and the quantity of gasoline produced based on liquid charged being tabulated under "percent gaso."

In Table 1, the sub-letter B, for example, 1-B designates an alumina-activated catalyst prepared as described in subdivision B of Example 1; and the sub-letter A, for example 1-A, a silica gel prepared as described in subdivision A, and dried but not alumina-activated.

The data in Table 1 clearly demonstrate the remarkable effect of the alumina-activation on the cracking ability of the silica-gel component. While the various silica gels used alone as contact agents during the first two hours on stream gave liquid products having 7–14% evaporated at 400° F., i. e., gasoline, with the same materials after alumina-activation the corresponding figures became 30 to 57%. In general, it is shown that a silica gel that gives little gasoline prior to activation is a comparatively poor cracking catalyst after activation, and vice versa, although the parallelism is not absolute. Silica gel made from sodium metasilicate 3-A and the same material activated with alumina 3-B, were used in the first pair of Runs 83 and 84 reported in Table 1. In this instance, the activated catalyst 3-B gave about four times as much gasoline as the non-activated gel, that is, 7.3% versus 29.6% during the first two hours, the silica gel itself being quite inactive. In the run in which the activated catalyst was employed, a much lower gas to gasoline ratio was observed as well as a difference in gas composition. With non-activated gel, the ethane content of the gas was high, while the propane content was low, whereas with the alumina-activated catalyst, the opposite was true.

In the following two Runs 81 and 88, the silica gel was prepared from water-glass (sodium silicate solution), the non-activated gel 2-A being used in the first run and the activated gel 2-B, in the second. This silica gel was a much better substrate than that obtained from sodium metasilicate, the alumina-activated catalyst giving 51% total gasoline (based on liquid product), during the first two hours on stream. Prior to activation, the gasoline content of the liquid product obtained during the first two hours on stream was only 8.7%.

In Run 294, alumina-activated silica gel prepared from water-glass was also used as a catalyst but the method of preparation and the method of activation were somewhat different from that used for 2-B. This catalyst gave practically the same gasoline production as catalyst 2-B, but the high hydrogen content of the gas and the low gas to gasoline ratio are noteworthy.

Silica gel prepared from ethyl-orthosilicate 5-A, and the same material 5-B, after alumina-activation, were used in Runs 71 and 72, respectively. The activated material was of a high order of efficiency, giving 47% total gasoline during the first two hours.

The preparation of the catalyst from ethyl-orthosilicate is of particular interest as illustrating the preparation from materials other than soluble metal silicates and also because the method assures the entire absence of sodium ions in the final catalyst.

Catalyst 1-A was the most catalytically reactive silica-gel tested, and after activation with alumina, constituted the most active alumina-activated catalyst, 1-B giving 57% total gasoline (based on liquid product), during the first two hours on stream.

Catalyst 1-B not only gave the greatest yield of all contacts considered in Table 1, but also declined in activity with time on stream the least. This is shown by reference to Figure 1 in which the gasoline content of the liquid products obtained during each two-hour period on stream, is plotted against time on stream. Data for all the described alumina-activated silica catalysts are shown in Figure 1 and the excellence of catalyst 1-B is immediately obvious.

The results in Table 1 show that apart from the alumina-activation treatment itself, the character of the silica gel substrate is the most important single factor in providing a catalyst of high activity; and that the most efficient catalysts are prepared by employing a silica substrate such as catalyst 1-B having a relatively high degree of activity when used alone as a contact agent. The procedure described in paragraph A of Example 1 is illustrative of the preferred method for providing a silica substrate of optimum characteristics, important features of this method being (a) the precipitation of the silica in an acid medium thereby producing what may be termed an "acid hydrogel"; (b) employing concentrations of reactants adapted to produce initially a colloidal silica sol which slowly sets to a jelly-like mass or hydrogel; and (c) substantially complete elimination of detrimental water-soluble material, particularly sodium compounds from the catalyst. The acid concentration employed in Example 1 is illustrative of the preferred concentration. In general, the colloidal silica sol should be allowed to set to a hydrogel in a medium containing from about three-tenths to nine-tenths grams ions of hydrogen per liter, the preferred concentration being about five-tenths grams ions of hydrogen per liter.

The catalytic activity of the catalyst may be varied to some extent by variations in the concentration of aluminum sulfate employed in the activating solution from the amount regarded as normal and preferred for most purposes as disclosed in Example 1. When only one-tenth the nomal amount of aluminum sulfate was used in the activating solution, the resulting catalyst was quite inactive, the gasoline content of the liquid product being about 14% less than that obtained with the normal material. Employing an activating solution having a concentration of aluminum sulfate one-half of the normal amount, it was observed that during the first two hours on stream the catalyst gave a slightly greater amount of gasoline than that obtained with catalyst 1-B; but during the subsequent period there resulted a decrease of about 5% in gasoline production. When five times the normal amount of aluminum sulfate was used in the activating solution, the liquid product produced during the first two hours on stream contained about 12% more gasoline than the liquid from runs employing catalyst 1-B; during hours three and four on stream, 4% more; hours five and six, 1% more; and hours seven and eight, 4% less.

Other aluminum salts and compounds may be employed for the alumina-activation treatment in place of aluminum sulfate and aluminum chloride used in the illustrative examples, in general, a salt which is hydrolyzable and which may be deposited by hydrolytic decomposition being preferred.

Salts of aluminum which may be or which are converted to alumina by procedures other than hydrolytic decomposition may be employed. For example, the silica gel or hydrogel may be impregnated with a solution of aluminum nitrate which is relatively easily decomposed by thermal decomposition to alumina.

In accordance with a modification employing a readily heat-decomposable aluminum salt such as aluminum nitrate, the salt is added as a solid to the silica-hydrogel after the latter is washed. The mixture is then mixed or "creamed" as described in the modification under Example 1, dried, for example at a temperature of about 150° F., and then heated to an elevated temperature, suitably about 932° F., to decompose the salt to alumina.

The alumina is preferably formed in situ on the silica by adding the aluminum salt and then decomposing it to alumina by hydrolytic or thermal decomposition. However, direct additions of alumina as such may be employed.

The quantity of alumina included in the catalyst prepared in accordance with Example 1 is relatively small, i. e., of the order of about one to one-half per cent by weight of the total. Accordingly, the addition of alumina by hydrolytic deposition as described in this example results in a highly effective distribution of the alumina, and requires a relatively small amount of this more expensive component. As previously noted, the activity of the catalyst, and presumably the amount of alumina deposited, may be varied somewhat by variations in concentrations of the activating solution.

When methods of activation are employed other than hydrolytic deposition, larger quantities of alumina may be conveniently and suitably added. In general, it has been found desirable to employ a minor and relatively small amount of alumina relative to the silica gel component, i. e., 20 to 15% or less, and when employing the hydrolytic deposition method of activation, a relatively small amount of the order of about 1%.

A highly important advantage of the catalysts is the relative ease with which they may be regenerated after use by subjection to a controlled mild combustion treatment for removal of carbonaceous material or coke deposited thereon during the conversion stage. The activity of the regenerated catalyst may be increased by giving it a further alumina-activation treatment to replace that portion of the alumina undergoing a permanent deactivation, although such reactivation is not normally considered necessary.

It is to be understood that the particular charging stock and process conditions given above merely exemplify the application of my invention, and are susceptible of wide variation. My process is particularly well exemplified by the treatment of heavy boiling hydrocarbon fractions such as gas oil to produce motor fuels boiling within the gasoline boiling range. The application of my invention in this connection is characterized by the production of relatively high yields of gasoline, and also a gasoline of relatively high anti-knock quality as compared with gasoline made by conventional thermal cracking methods.

Table 1

| | Run. No. | | | | | | | | | |
|---|---|---|---|---|---|---|---|---|---|---|
| | 83 | | | 84 | | | 81 | | | |
| Catalyst No. | 2-A | | | 2-B | | | 2-A | | | |
| Operating temp., F° | 850 | | | 850 | | | 850 | | | |
| Properties of liquid prod.: | Percent 400° | Percent loss | E. P. | Percent 400° | Percent loss | E. P. | Percent 400° | Percent loss | E. P. | |
| First two hours | 6.5 | 0.8 | 706 | 25.5 | 1.1 | 690 | 7.0 | 1.2 | 716 | |
| Second | 6.0 | 0.6 | 723 | 16.0 | 1.4 | 604 | 6.0 | 1.0 | 702 | |
| Third | 5.2 | 0.7 | 723 | 11.0 | 1.7 | 724 | 6.8 | 1.0 | 694 | |
| Fourth | 4.3 | 0.7 | 725 | 9.5 | 1.1 | 718 | | | | |
| Fifth | | | | 9.0 | 1.5 | 723 | | | | |
| Sixth | | | | 9.0 | 1.5 | 728 | | | | |
| Seventh | | | | | | | | | | |
| Calculated prop. liquid: | Ev. 400° | Percent gasoline | | Ev. 400° | Percent gasoline | | Ev. 400° | Percent gasoline | | |
| First two hours | 7.3 | 7.0 | | 29.6 | 27.3 | | 8.7 | 8.7 | | |
| Second | 6.6 | 6.5 | | 20.1 | 19.7 | | 7.6 | 7.3 | | |
| Third | 5.9 | 5.8 | | 14.5 | 14.3 | | 8.4 | 8.1 | | |
| Fourth | 5.0 | 5.0 | | 12.3 | 12.3 | | | | | |
| Fifth | | | | 12.1 | 12.1 | | | | | |
| Sixth | | | | 12.0 | 12.0 | | | | | |
| Gas composition, percent by vol.: | As prod. | C₄ free | | As prod. | C₄ free | | As prod. | C₄ free | | |
| Hydrogen | 8.8 | 8.8 | | 9.3 | 11.5 | | 12.6 | 13.7 | | |
| Methane | 22.8 | 22.8 | | 17.1 | 21.2 | | 25.2 | 27.4 | | |
| Ethane | 41.2 | 41.2 | | 19.6 | 24.3 | | 29.8 | 32.3 | | |
| Propane | 27.2 | 27.2 | | 34.8 | 43.0 | | 24.5 | 26.6 | | |
| Butane | | | | 19.8 | | | 5.9 | | | |
| Higher | | | | 0 | | | 2.0 | | | |
| Yields, percent by wt.: | | | | | | | | | | |
| Liquid | 96.6 | | | 95.4 | | | 96.4 | | | |
| Gas | 2.1 | | | 3.3 | | | 2.1 | | | |
| C+ loss | 1.3 | | | 1.3 | | | 1.5 | | | |
| Lbs. gas/gal. gasoline | 2.44 | | | 1.46 | | | 1.79 | | | |

| | Run. No. | | | | | |
|---|---|---|---|---|---|---|
| | 88 | | | 294 | | |
| Catalyst No. | 2-B | | | 4 | | |
| Operating temp., F° | 850 | | | 860 | | |
| Properties of liquid prod.: | Percent 400° | Percent loss | E. P. | Percent 400° | Percent loss | E. P. |
| First two hours | 42.0 | 4.0 | 694 | 41.5 | 4.3 | 706 |
| Second | 28.0 | 2.5 | 702 | 26.5 | 3.3 | 682 |
| Third | 25.2 | 2.8 | 686 | 23.0 | 3.2 | 702 |
| Fourth | 21.8 | 2.0 | 698 | 18.5 | 2.9 | 685 |
| Fifth | | | | | | |
| Sixth | | | | | | |
| Seventh | | | | | | |
| Calculated prop. liquid: | Ev. 400° | Percent gasoline | | Ev. 400° | Percent gasoline | |
| First two hours | 51.0 | 45.3 | | 50.0 | 37.0 | |
| Second | 34.9 | 34.0 | | 34.4 | 29.8 | |
| Third | 32.4 | 31.9 | | 30.7 | 29.2 | |
| Fourth | 27.8 | 27.5 | | 25.9 | 24.7 | |
| Fifth | | | | | | |
| Sixth | | | | | | |
| Gas composition, percent by vol.: | As prod. | C₄ free | | As prod. | C₄ free | |
| Hydrogen | 5.1 | 6.8 | | 17.9 | 23.6 | |
| Methane | 6.8 | 9.1 | | 16.4 | 21.6 | |
| Ethane | 18.7 | 25.0 | | 13.5 | 17.8 | |
| Propane | 44.1 | 59.1 | | 28.1 | 37.0 | |
| Butane | 25.3 | | | 22.0 | | |
| Higher | 0 | | | 2.1 | | |
| Yields, percent by wt.: | | | | | | |
| Liquid | 90.5 | | | 83.8 | | |
| Gas | 8.3 | | | 5.5 | | |
| C+ loss | 1.2 | | | 10.7 | | |
| Lbs. gas/gal. gasoline | 1.72 | | | 1.29 | | |

Table 1—Continued

| | Run No. | | | | | | | | | | | |
|---|---|---|---|---|---|---|---|---|---|---|---|---|
| | 71 | | | 72 | | | 67 | | | 75 | | |
| Catalyst No. | 5-A | | | 5-B | | | 1-A | | | 1-B | | |
| Operating temp., °F | 850 | | | 850 | | | 850 | | | 850 | | |
| Properties of liquid prod.: | Percent 400° | Percent loss | E. P. | Percent 400° | Percent loss | E. P. | Percent 400° | Percent loss | E. P. | Percent 400° | Percent loss | E. P. |
| First two hours | 7.5 | 1.6 | 715 | 36.0 | 2.4 | 688 | 11.2 | 1.1 | 694 | 42.0 | 2.1 | 688 |
| Second | 7.8 | 1.0 | 705 | 19.8 | 2.5 | 697 | 11.8 | 1.1 | 694 | 33.2 | 0.8 | 690 |
| Third | 8.2 | 1.2 | 700 | 14.2 | 1.6 | 712 | 12.0 | 1.0 | 696 | 27.2 | 2.0 | 686 |
| Fourth | 9.0 | 1.0 | 705 | 12.2 | 1.3 | 716 | | | | 23.8 | 2.8 | 688 |
| Fifth | 7.5 | 0.9 | 700 | 9.8 | 1.4 | 703 | | | | 23.0 | 1.6 | 679 |
| Sixth | 8.0 | 1.0 | 696 | 10.0 | 1.0 | 712 | | | | | | |
| Seventh | 7.5 | 1.3 | 724 | | | | | | | | | |
| Calculated prop. liquid: | Ev. 400° | Percent gasoline | | Ev. 400° | Percent gasoline | | Ev. 400° | Percent gasoline | | Ev. 400° | Percent gasoline | |
| First two hours | | | | 47.2 | 38.9 | | 13.8 | 13.8 | | 56.7 | 48.1 | |
| Second | | | | 27.0 | 25.0 | | 14.3 | 14.3 | | 46.8 | 44.5 | |
| Third | | | | 19.0 | 18.7 | | 14.3 | 14.3 | | 39.9 | 38.6 | |
| Fourth | | | | 16.1 | 16.0 | | | | | 35.2 | 35.8 | |
| Fifth | | | | | | | | | | 32.9 | 32.9 | |
| Sixth | | | | 13.1 | 13.2 | | | | | | | |
| Gas composition, percent by vol.: | | | | As prod. | C₄ free | | As prod. | C₄ free | | As prod. | C₄ free | |
| Hydrogen | | | | 13.2 | 17.0 | | 10.0 | 11.8 | | 8.1 | 13.5 | |
| Methane | | | | 21.1 | 26.3 | | 29.8 | 35.2 | | 12.9 | 21.5 | |
| Ethane | | | | 24.8 | 32.1 | | 21.9 | 25.9 | | 15.5 | 25.8 | |
| Propane | | | | 18.3 | 23.6 | | 22.9 | 27.1 | | 23.5 | 39.2 | |
| Butane | | | | 16.7 | | | 12.8 | | | 27.3 | | |
| Higher | | | | 5.9 | | | 2.6 | | | 12.7 | | |
| Yields, percent by weight: | | | | | | | | | | | | |
| Liquid | | | | 91.7 | | | 97.8 | | | 89.8 | | |
| Gas | | | | 4.6 | | | 2.7 | | | 7.4 | | |
| C+ loss | | | | 3.7 | | | +0.5 | | | 2.8 | | |
| Lbs. gas/gal. gasoline | | | | 1.56 | | | 1.37 | | | 1.31 | | |

I claim:

1. In the catalytic conversion of hydrocarbon oils wherein silica gel containing other catalytic agents is employed as a catalyst and wherein the catalyst is subjected to repeated regenerations by oxidation between conversion treatments to remove carbonaceous deposits formed thereon during said conversion treatment; the improvement which comprises contacting the oil to be converted under conversion conditions with a synthetic gel containing silica prepared from an alkyl silicate whereby an alkaline-free catalyst is obtained, the activity of which is less sensitive to high temperatures normally resulting from the regenerative treatment, periodically separating the catalyst from the oils being subjected to conversion and subjecting the catalyst so separated to regenerative treatment.

2. In the catalytic conversion of hydrocarbon oils wherein silica gel containing other catalytic agents is employed as a catalyst and wherein the catalyst is subjected to repeated regenerations by oxidation between conversion treatments to remove carbonaceous deposits formed thereon during said conversion treatment; the improvement which comprises contacting the oil to be converted under conversion conditions with a synthetic gel containing silica prepared from an alkyl silicate whereby an alkaline-free catalyst is obtained.

3. In the catalytic conversion of hydrocarbon oils wherein silica gel containing other catalytic agents is employed as a catalyst and wherein the catalyst is subjected to regeneration by oxidation after conversion treatment to remove carbonaceous deposits formed thereon during said conversion treatment; the improvement which comprises contacting the oil to be converted under conversion conditions with a synthetic gel containing silica prepared from an alkyl silicate whereby an alkaline-free catalyst is obtained.

ROBERT F. RUTHRUFF.